(12) United States Patent
Pouli et al.

(10) Patent No.: US 11,270,417 B2
(45) Date of Patent: Mar. 8, 2022

(54) TONE-MAPPING OF COLORS OF A VIDEO CONTENT

(71) Applicant: InterDigital VC Holdings, Inc., Wilmington, DE (US)

(72) Inventors: Tania Pouli, Le Rheu (FR); Laurent Cauvin, Chevaigne (FR); Jonathan Kervec, Le Rheu (FR); Hassane Guermoud, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/259,471

(22) PCT Filed: May 1, 2019

(86) PCT No.: PCT/US2019/030103
§ 371 (c)(1),
(2) Date: Jan. 11, 2021

(87) PCT Pub. No.: WO2020/013904
PCT Pub. Date: Jan. 16, 2020

(65) Prior Publication Data
US 2021/0272250 A1    Sep. 2, 2021

(30) Foreign Application Priority Data

Jul. 11, 2018  (EP) ..................................... 18305931

(51) Int. Cl.
*G06T 5/00* (2006.01)
*G06T 5/50* (2006.01)
*H04N 9/64* (2006.01)

(52) U.S. Cl.
CPC ................ *G06T 5/009* (2013.01); *G06T 5/50* (2013.01); *H04N 9/64* (2013.01); *G06T 2207/10016* (2013.01); *G06T 2207/10024* (2013.01)

(58) Field of Classification Search
CPC . G06T 5/009; G06T 5/50; G06T 2207/10016; G06T 2207/10024; H04N 9/64
See application file for complete search history.

(56) References Cited

U.S. PATENT DOCUMENTS 9,087,382 B2 *  7/2015  Zhai ......................... G06T 5/008
9,336,578 B2 *  5/2016  Wang ....................... G06T 5/009
(Continued)

FOREIGN PATENT DOCUMENTS

EP  3087730 A1  11/2016
EP  3249606 A1  11/2017
(Continued)

OTHER PUBLICATIONS

Impoco et al., "Adaptive Reduction of the Dynamics of HDR Video Sequences", IEEE International Conference on Image Processing 2005, Genova, Italy, Sep. 14, 2005, 4 pages.
(Continued)

*Primary Examiner* — Brian P Yenke
(74) *Attorney, Agent, or Firm* — Condo Roccia Koptiw LLP

(57) ABSTRACT

For the processing of an image with a tone-mapping function, it is known to select a tone-mapping function among a reference collection of reference tone-mapping functions and to apply the selected tone-mapping function to colors of this image. When applying this method to images of a video content, it is proposed to add, after such a selection for an image, a step of validation of this selection for the next images of video content. Advantage: prevent too frequent
(Continued)

Figure 1:
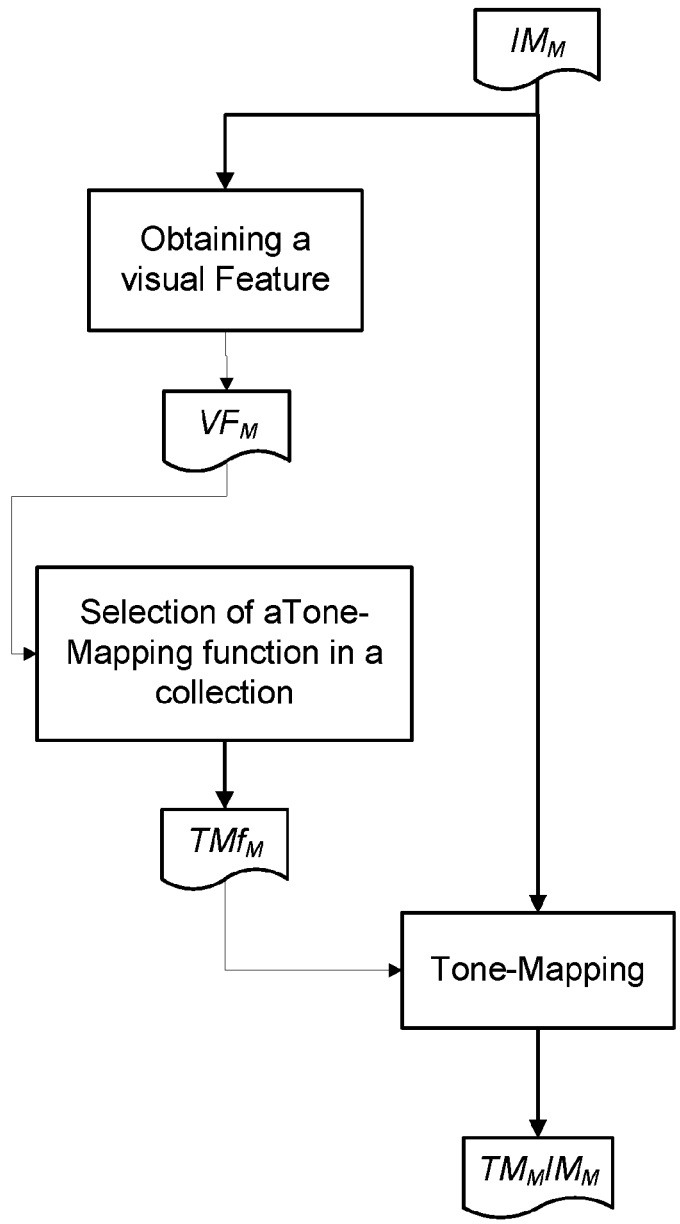

changes of tone-mapping function inside a video content, lower temporal instabilities and visual discomfort during visualization.

16 Claims, 2 Drawing Sheets

(56) References Cited

U.S. PATENT DOCUMENTS

| | | | |
|---|---|---|---|
| 9,406,112 | B2 | 8/2016 | Banterle et al. |
| 10,148,906 | B2* | 12/2018 | Seifi .................. H04N 7/01 |
| 10,176,561 | B2* | 1/2019 | Evans ................ G06T 5/009 |
| 10,319,085 | B2* | 6/2019 | Min .................... G06T 5/009 |
| 10,530,995 | B2* | 1/2020 | Douady-Pleven ..... H04N 5/357 |
| 10,535,124 | B2* | 1/2020 | Guermoud .......... G06K 9/4661 |
| 10,984,698 | B2* | 4/2021 | Shin ................... G09G 3/2007 |
| 2015/0348245 | A1* | 12/2015 | Horiuchi ............ H04N 9/67 382/167 |
| 2016/0328830 | A1* | 11/2016 | Pouli ................ H04N 21/4318 |
| 2017/0070719 | A1 | 3/2017 | Smolic et al. |
| 2018/0150946 | A1* | 5/2018 | Roffet ................. G06T 7/90 |

FOREIGN PATENT DOCUMENTS

| | | |
|---|---|---|
| WO | WO 2015096955 A | 7/2015 |
| WO | WO 2016192937 A1 | 12/2016 |
| WO | WO 2017032822 A1 | 3/2017 |

OTHER PUBLICATIONS

Ramsey et al., "Adaptive Temporal Tone Mapping", 7th IASTED International Conference on Computer Graphics and Imaging (CGIM), Kauai, HI, United States, Aug. 16, 2004, 5 pages.

Eilertsen et al., "A Comparative Review of Tone-Mapping Algorithms for High Dynamic Range Video", Computer Graphics Forum, Eurographics 2017, vol. 36, No. 2, May 2017, pp. 565-592.

Anonymous, "Information technology—Multimedia content description interface—Part 11: MPEG-7 profile Schemas", International Organization for Standarization, Technical Report ISO/IEC TR 15938-11, Jul. 1, 2005, 82 pages.

Boitard et al., "Temporal Coherency for Video Tone Mapping", International Society for Optics and Photonics, Applications of Digital Image Processing XXXV, Proceedings SPIE vol. 8499, Oct. 15, 2012, 10 pages.

Kang et al., "High Dynamic Range Video", ACM Transactions on Graphics, vol. 22, Issue 3, Jul. 2003, pp. 319-325.

Jang et al., "Content-Dependent Contrast Enhancement for Displays based on Cumulative Distribution Function", IS&T/SPIE Electronic Imaging, Proceedings of SPIE vol. 8652, Color Imaging XVIII, Feb. 4, 2013, 8 pages.

* cited by examiner

TONE-MAPPING OF COLORS OF A VIDEO CONTENT

This application claims the benefit, under 35 U.S.C. § 365 of International Application PCT/US2019/030103, filed May 1, 2019 which was published in accordance with PCT Article 21(2) on Jan. 16, 2019, in English, and which claims the benefit of European Patent Application No. 18305931.0, filed Jul. 11, 2018

TECHNICAL FIELD

The invention relates to mapping of tones or colors of images. Tone-mapping is understood as a generic term including a tone-mapping that compresses a color range and a tone-mapping that expands a color range (generally named "inverse tone-mapping").

BACKGROUND ART

The document EP3249606 discloses, for the processing of an image, the selection of an inverse Tone Mapping (iTM) algorithm among a reference collection of reference iTM algorithms and the application of the selected ITM algorithm to colors of this image, notably to convert this image into a HDR format. According to this method, a collection of reference iTM algorithms is built. Any reference iTM algorithm of this collection is an iTM algorithm which is optimized to color content of associated reference images. According to this method, a visual feature is associated with each reference iTM algorithm, based on the color content of the reference image(s) associated with this reference iTM algorithm. According to this method as illustrated on FIG. 1, the visual feature $VF_M$ of the image $IM_M$ to process is computed, and the selection of an iTM algorithm $TMf_M$ is performed such that the visual feature associated with this selected iTM algorithm is the closest (among visual features associated with other reference iTM algorithms of the collection) to the visual feature of the image to process. The selected iTM algorithm $TMf_M$ is then applied ("Tone-Mapping" operation) to the image $IM_M$ to process, resulting in the processed image $TM_M/M_M$. See also the article entitled "Content Dependent Contrast Enhancement for Displays based on Cumulative Distribution Function", from Seul Ki Jang et al., published in 2013 in Proc. of SPIE Vol. 8652.

When applying such an image processing method to images of a video content, the video content should be cut into shots such that, within each shot, the color content is homogenous enough to apply the same selected iTM algorithm to each image of the shot.

SUMMARY OF INVENTION

In order to prevent too frequent changes of iTM algorithm inside a video shot that would cause temporal instabilities and visual discomfort during visualization, it is proposed to add, after the selection of a reference iTM for an image of the shot, a step of validation of this selection for the next images of this shot.

Preferably, it is also proposed to apply progressively any change of iTM algorithm as soon as it is validated.

Note that the document U.S. Pat. No. 9,406,112 discloses changing a Tone Mapping (TM) function only when the difference between a previous and a new TM function is large enough. WO2016192937 considers the full history of previous TM curves applied to previous frames to parametrize a new TM curve to apply to a current frame. In US20170070719, a tone mapping system may use an average of previous tone curve parameter values.

More precisely, a first aspect of the disclosure is directed to a method for tone or color mapping images of a video content according to a tone mapping function, comprising iterating on a plurality of successive images of the video content and for at least one image of the plurality of successive images: selecting in a reference collection of tone-mapping functions a reference tone-mapping function according to a visual feature determined from said at least one image; when the selected reference tone mapping function is different from a previously selected tone mapping function for the previous image in the plurality of successive images, determining a reference tone mapping function according to a validation step; and applying the determined reference tone-mapping function to said at least one image resulting into a corresponding tone-mapped image, wherein the reference collection comprises reference tone-mapping functions associated with reference visual features.

In variants of the first aspect, the validation step uses a plurality of successive images and either selects the reference tone mapping function determined for the successive images that is the most frequent, or selects a reference tone mapping function according to a number of consecutive selections of a same reference tone mapping function or selects the reference tone mapping function with increasing occurrence compared to the other reference tone mapping functions.

In a further variant of first aspect, selecting a reference tone-mapping function is done according to a selection criterion based on a minimum distance between the visual feature of the image and the reference visual feature associated with this selected reference tone-mapping function. In a further variant of first aspect, the transition between a first reference tone mapping function and a second reference tone mapping function is done progressively over a plurality of images by varying the weights between both functions, the weight of the first function decreasing during the transition and the weight of the second function increasing during the transition. In a further variant of first aspect, for the first image of the video, the selected reference tone mapping function does not require any validation step and is applied to the first image of the video.

A second aspect of the disclosure is directed to a device for tone or color mapping images of a video content according to a tone mapping function, comprising at least one processor configured for implementing the above method. Preferably, this device is chosen in the group composed of a mobile device, a communication device, a game device, a tablet, a laptop, a camera, a chip, a server, a TV set and a Set-Top Box.

A third aspect of the disclosure is directed to a computable readable storage medium comprising stored instructions that when executed by a processor performs the above method.

BRIEF DESCRIPTION OF DRAWINGS

The invention will be more clearly understood on reading the description which follows, given by way of non-limiting example and with reference to the appended figures in which:

FIG. 1 is a flowchart of an inverse tone-mapping method as described in EP3249606.

FIG. 2 is a flowchart of an embodiment of a tone-mapping method according to the invention.

DESCRIPTION OF EMBODIMENTS

The functions of the various elements shown in the figures may be provided through the use of dedicated hardware as well as hardware capable of executing software in association with appropriate software. Explicit use of the term "processor" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Any switches shown in the figures are conceptual only. Their function may be carried out through the operation of program logic, through dedicated logic, through the interaction of program control and dedicated logic, or even manually, the particular technique being selectable by the implementer as more specifically understood from the context.

It is to be understood that the image processing method may be implemented in various forms of hardware, software, firmware, special purpose processors, or combinations thereof. This method may be notably implemented as a combination of hardware and software. Moreover, the software may be implemented as an application program tangibly embodied on a program storage unit. The application program may be uploaded to, and executed by, a computing machine comprising any suitable architecture. Preferably, the machine is implemented on an apparatus having hardware such as one or more central processing units ("CPU"), a random access memory ("RAM"), and input/output ("I/O") interfaces. The apparatus may also include an operating system and microinstruction code. The various processes and functions described herein may be either part of the microinstruction code or part of the application program, or any combination thereof, which may be executed by a CPU. In addition, various other peripheral units may be connected to the apparatus such as an actual or virtual keyboard, a display device and an additional data storage unit.

As a whole, this apparatus may notably be a mobile device (such as a smartphone), a communication device, a game device, a tablet (or tablet computer), a laptop, a TV set, a Set-Top-Box, a camera, an encoding chip or a server (e.g. a broadcast server, a video-on-demand server or a web server).

A main embodiment of the image processing method will now be described, using an apparatus as described above having at least one processor and at least one memory configured in a manner known per se to implement this method.

The memory stores a reference collection of reference tone-mapping algorithms and associated visual features. Tone-mapping is a generic term including tone-mapping that compresses a color range and tone-mapping that expands a color range (generally named "inverse tone-mapping"). This reference collection is for instance built as disclosed in EP3249606 as follows:

images having different visual features are collected with an optimized tone-mapping function for each of them; the term "function" is generic and includes any equivalent terms as "algorithm", "Look-Up-Table" (LUT) or "curve"; a tone-mapping function is a function of at least the luminance or lightness of a pixel of the image to tone-map; a tone-mapping function is notably an exponential function of luminance as described in the document EP3087730, in which exponent values used for this function are computed for each pixel of the image; a tone-mapping function is for instance optimized for an image by colorists using dedicated known tools. Visual feature of an image characterizes for instance a distribution of values of luminance of colors of this image and is for instance represented by a histogram of values of luminance. Other visual features can be used instead as for instance a Dominant Color Descriptor or a Color Structure Descriptor as quoted in the MPEG7 standard. Preferably, the visual feature is defined to depend on luminance.

images having close optimized tone-mapping functions are then clustered such that reference images of any given cluster have tone-mapping functions that are close together according to a distance criterion; the close optimized tone-mapping functions of any cluster are then averaged in one reference tone-mapping function associated with this cluster; the visual features of images of any cluster are then averaged in one reference visual feature associated with this cluster. For instance, if the visual feature is based on luminance histogram, a mean histogram is computed as a reference visual feature. It means that each reference tone-mapping function is associated with a reference visual feature of the same cluster. As a variant, the clustering can be based on close visual features.

Building such a collection of reference tone-mapping functions and associated reference visual features can be performed "off-line"—in the same platform or in another platform—during a preliminary training phase comprising:
collecting images having different visual features,
generating an optimized tone-mapping function for each image,
clustering the optimized tone-mapping functions with their associated visual features as described above.

Figure 2:
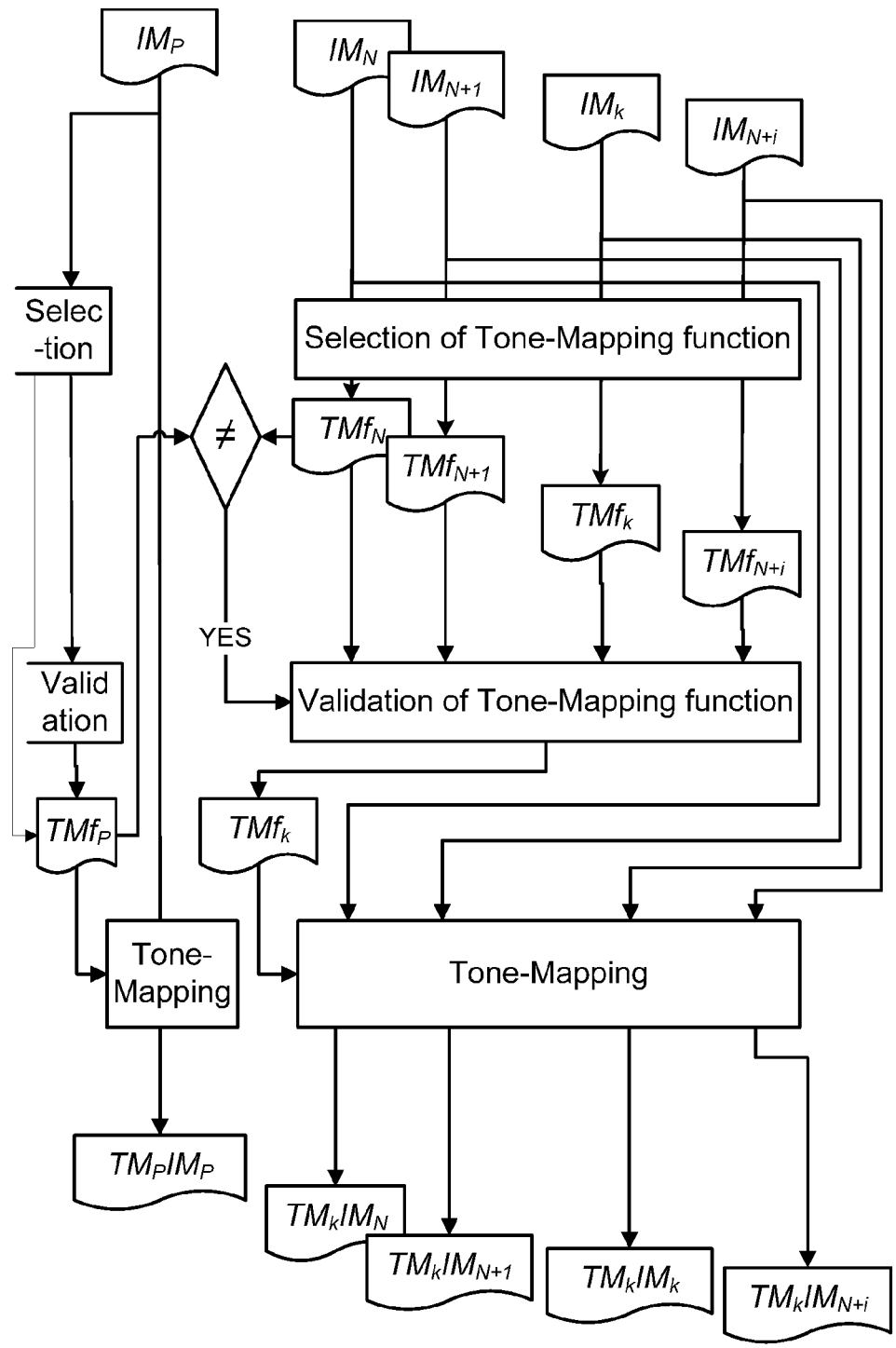

The image processing method will now be described in reference to FIG. 2 for tone mapping colors of a video content.

The memory receives, preferably in a buffer, images of the video content to be tone-mapped.

For a first image of the content, in the reference collection of reference tone-mapping functions, a reference tone-mapping function is selected according to a selection criterion based on a minimum distance between the reference visual feature associated with this selected reference tone-mapping function and the visual feature of this first image. For instance, a distance is computed between each reference visual feature of the collection and the visual feature of the first image. When the visual feature is a histogram of values of luminance as described above, the shortest computed distance indicates that the distribution of luminance values within the first image is close to a reference distribution of luminance values of the collection, and the reference tone-mapping function associated with this close reference distribution of luminance values is selected. Then, the selected reference tone-mapping function is applied to the first image resulting into a corresponding tone-mapped first image.

The application of the selected reference tone-mapping function is reiterated from image to image of the content, i.e. from a previous image to a following image, as far as the reference tone-mapping function selected for a following image is the same as the reference tone-mapping function selected for the previous image.

As soon as reference tone-mapping function $TMf_N$ selected for a following image $IM_N$ is different from a reference tone-mapping function $TMf_P$ selected for a previous image $IM_P$ (this situation is represented on FIG. 2 by the sign "≠" in a rhombus), a so-called current validation sequence of i+1 images is formed $IM_N$, $IM_{N+1}$, . . . , $IM_k$, . . . , $IM_{N+i}$.

Then a validation step is launched as follows for the i+1 images $IM_N$, $IM_{N+1}$, . . . , $IM_k$, . . . , $IM_{N+i}$ of the content. The number i+1 of images used for the validation of a change or non-change of tone-mapping function is superior to 2. For instance, for a frame rate of 25 images/second, i+1=5.

This validation step aims at making a decision to change the tone-mapping function or not to change the tone-mapping function and, in case a change is decided, to validate a "right" new reference tone-mapping function to be applied to images of the sequence, with, optionally, a transition step in between (see below).

Prior to the validation step itself, based on the same selection criterion as above, a reference tone-mapping function $TMf_{N+1}, \ldots, TMf_k, \ldots, TMf_{N+i}$ is selected in the collection of reference tone-mapping functions for each of the i last images $IM_{N+1}, \ldots, IM_k, \ldots, IM_{N+i}$ of the current validation sequence.

Once all reference tone-mapping functions $TMf_N$, $TMf_{N+1}, TMf_{N+2}, TMf_{N+3}, TMf_{N+4}, TMf_{N+5}, \ldots, TMf_{k-1}$, $TMf_k, TMf_{k+1}, \ldots, TMf_{N+i}$ are selected for all images of the current validation sequence, the validation step is performed according to a validation criterion, preferably based on a distribution of these selected tone-mapping functions.

Assuming for instance i=9 and k=N+7, then the ten reference tone-mapping functions are listed as follows: $TMf_N$, $TMf_{N+1}$, $TMf_{N+2}$, $TMf_{N+3}$, $TMf_{N+4}$, $TMf_{N+5}$, $TMf_{k-1}$, $TMf_k$, $TMf_{k+1}$, $TMf_{N+i}$.

Let assume for instance that, in this list, there are only two different reference tone-mapping functions: P1 and P2, and that the distribution is as follows: $TMf_N$=P2, $TMf_{N+1}$=P1, $TMf_{N+2}$=P1, $TMf_{N+3}$=P2, $TMf_{N+4}$=P2, $TMf_{N+5}$=P2, $TMf_{k-1}$=P1, $TMf_k$=P2, $TMf_{k+1}$=P2, $TMf_{N+i}$=P2.

In this situation (distribution=P2P1P1P2P2P2P1P2P2P2), the two different reference tone-mapping functions P1 and P2 are distributed over two bins, a first bin for P1 with a value of 3, and a second bin for P2 with a value of 7.

The validation criterion is for instance defined such the reference tone-mapping function having the most populated bin in the distribution is validated, here P2 corresponding notably with $TMf_k$.

As a first variant, the validation criterion is based on a minimum of consecutive selection of a same reference tone-mapping function within the different images of the validation sequence. For instance, within the same validation sequence of 10 images (i=9) as above, this minimum could be fixed to a value of 4, leading to a validation of the same reference tone-mapping function $TMf_P$ selected for the previous image $IM_P$ (this situation is represented on FIG. 2 by the sign "≠" in a rhombus), because there are no four consecutive selections of P2 within this sequence.

As a second variant, the validation criterion is defined according a validation pattern of distribution of the selected reference tone-mapping functions over the different images of the validation sequence. For instance, if the distribution of different selected reference tone-mapping functions P1 and P2 over 20 images forming a validation sequence are: P1P1P1P2P2P1P1P1P2P2P1P1P1P2P2P2P2P1P1, as the pattern of distribution of P2 over images shows an increasing weight of P2 compared to that of P1 over the same images, P2 will be validated although the first bin for P1 with a value of 11 is superior to the second bin for P2 with a value of 9.

It may happen that at least one of the reference tone-mapping functions selected for the current validation sequence is the same as the one $TMf_M$ that has been validated for the previous validation sequence, i.e. for instance that $TMf_M$=P1. In case this reference tone-mapping function is validated (P1 being the most populated in the distribution), the tone-mapping function applied to images of the current validation sequence remains the same as the reference tone-mapping function applied to images of the previous current validation.

The last step of the current iteration is the application of the validated reference tone-mapping function to images of the current validation sequence, resulting in the following tone-mapped images $TM_k IM_N$, $TM_k IM_{N+1}, \ldots,$ $TM_k IM_k, \ldots, TM_k IM_{N+i}$.

Then, the above selection of a reference tone-mapping function for an image and its application to this image is reiterated for images following last image $IM_{N+i}$ of the validation sequence until a reference tone-mapping function selected for one of these following images is again different from a reference tone-mapping function selected for the previous image, and a new selection is performed again as above for each image of another validation sequence, another validation is performed as above of another reference tone-mapping function for this other validation sequence which is then applied to images of this other validation sequence.

Such iterations are performed until the end of the video content, resulting in a tone-mapped video content.

Thanks to the change the tone-mapping functions only after validation of the selection for several successive images of the content, too frequent changes of tone-mapping functions inside such a video content are prevented, temporal instabilities and visual discomfort are avoided during visualization.

In a preferred variant, when the reference tone-mapping function P2 which is validated for the current validation sequence is different from the reference tone-mapping function P1 validated for the previous validation sequence, a progressive change of tone-mapping function from P1 to P2 is implemented.

This progressive change of tone-mapping function is applied to images of a transition sequence.

The number of images in the transition sequence can for instance be defined as a fixed number, or can be obtained by metadata, or can be an homogeneous non-decreasing function of a difference between the reference tone-mapping function P2 which is validated for the current validation sequence and the reference tone-mapping function P1 validated for the previous validation sequence, the maximum number of images in the transition sequence being the number i of images in the current validation sequence.

It is assumed that a number j of images in the transition sequence is obtained, where j<i. Instead of applying the reference tone-mapping function P2 validated for the current validation sequence to each of the j first images of the current validation sequence, a transition tone-mapping function $TMTR_t$ is applied to each $IM_t$ of these j images which is obtained by an interpolation between the two validated reference tone-mapping function P1 and P2, preferably according to the formula: $TMTR_t = t/j * P1 + (1 - t/j) * P2$, where t is the ordering number of this image $IM_t$ in the transition sequence. Along images of the transition sequence, the weight of the newly validated reference tone-mapping function P2 is then progressively increased and the weight of the previously validated reference tone-mapping function P1 is then progressively decreased in transition tone-mapping functions $TMTR_t$, with t varying from 1 to j, applied to these images.

Although the illustrative embodiments of the invention have been described herein with reference to the accompanying drawings, it is to be understood that the present invention is not limited to those precise embodiments, and that various changes and modifications may be effected

The invention claimed is:

1. A method for tone or color mapping images of a video content according to a tone mapping function, comprising:
   iterating on a plurality of successive images of the video content and for at least one image of the plurality of successive images:
      selecting in a reference collection of tone-mapping functions a reference tone-mapping function according to a visual feature determined from said at least one image;
      when the selected reference tone mapping function is different from a previously selected tone mapping function for the previous image in the plurality of successive images, determining a reference tone mapping function according to a validation step; and
      applying the determined reference tone-mapping function to said at least one image resulting into a corresponding tone-mapped image,
   wherein the reference collection comprises reference tone-mapping functions associated with reference visual features.

2. The method of claim 1, wherein the validation step uses a plurality of successive images and selects a reference tone mapping function determined for the successive images that is the most frequent.

3. The method of claim 1, wherein the validation step uses a plurality of successive images and selects a reference tone mapping function according to a number of consecutive selections of a same reference tone mapping function.

4. The method of claim 1, wherein the validation step uses a plurality of successive images and selects the reference tone mapping function with increasing occurrence compared to the other reference tone mapping functions.

5. The method of claim 1, wherein selecting a reference tone-mapping function is done according to a selection criterion based on a minimum distance between the visual feature of the image and the reference visual feature associated with this selected reference tone-mapping function.

6. The method of claim 1, wherein the transition between a first reference tone mapping function and a second reference tone mapping function is done progressively over a plurality of images by varying the weights between both functions, the weight of the first function decreasing during the transition and the weight of the second function increasing during the transition.

7. The method of claim 1, wherein, for the first image of the video, the selected reference tone mapping function does not require any validation step and is applied to the first image of the video.

8. A device for tone or color mapping images of a video content according to a tone mapping function, comprising at least one processor configured to:
   iterate on a plurality of successive images of the video content and for at least one image of the plurality of successive images:
      select in a reference collection of tone-mapping function a reference tone-mapping function according to a visual feature determined from said at least one image;
      when the selected reference tone mapping function is different from a previously selected tone mapping function for the previous image in the plurality of successive images, determine a reference tone mapping function according to a validation step; and
      apply the determined reference tone-mapping function to said at least one image resulting into a corresponding tone-mapped image,
   wherein the reference collection comprises reference tone-mapping functions associated with reference visual features.

9. The device of claim 8, wherein, for the first image of the video, the selected reference tone mapping function does not require any validation step and is applied to the first image of the video.

10. The device of claim 8 chosen in the group composed of a mobile device, a communication device, a game device, a tablet, a laptop, a camera, a chip, a server, a TV set and a Set-Top Box.

11. The device of claim 8, wherein the validation step uses a plurality of successive images and selects a reference tone mapping function determined for the successive images that is the most frequent.

12. The device of claim 8, wherein the validation step uses a plurality of successive images and selects a reference tone mapping function according to a number of consecutive selections of a same reference tone mapping function.

13. The device of claim 8, wherein the validation step uses a plurality of successive images and selects the reference tone mapping function with increasing occurrence compared to the other reference tone mapping functions.

14. The device of claim 8, wherein selecting a reference tone-mapping function is done according to a selection criterion based on a minimum distance between the visual feature of the image and the reference visual feature associated with this selected reference tone-mapping function.

15. The device of claim 8, wherein the transition between a first reference tone mapping function and a second reference tone mapping function is done progressively over a plurality of images by varying the weights between both functions, the weight of the first function decreasing during the transition and the weight of the second function increasing during the transition.

16. A non-transitory computer-readable storage medium having stored instructions that, when executed by a processor, cause the processor to iterate on a plurality of successive images of the video content and for at least one image of the plurality of successive images:
   select in a reference collection of tone-mapping functions a reference tone-mapping function according to a visual feature determined from said at least one image;
   when the selected reference tone mapping function is different from a previously selected tone mapping function for the previous image in the plurality of successive images, determine a reference tone mapping function according to a validation step; and
   apply the determined reference tone-mapping function to said at least one image resulting into a corresponding tone-mapped image,
wherein the reference collection comprises reference tone-mapping functions associated with reference visual features.

* * * * *